United States Patent [19]

Balser

[11] Patent Number: 4,508,895

[45] Date of Patent: Apr. 2, 1985

[54] PROCESS FOR THE PRODUCTION OF HYDROXYALKYL METHYL CELLULOSES

[75] Inventor: Klaus Balser, Walsrode, Fed. Rep. of Germany

[73] Assignee: Bayer Aktiengesellschaft, Leverkusen-Bayerwerk, Fed. Rep. of Germany

[21] Appl. No.: 579,767

[22] Filed: Feb. 13, 1984

Related U.S. Application Data

[63] Continuation of Ser. No. 488,019, Apr. 25, 1983, abandoned.

[30] Foreign Application Priority Data

May 5, 1982 [DE] Fed. Rep. of Germany ....... 3216786

[51] Int. Cl.$^3$ ..................... C08B 11/193; C08B 11/08
[52] U.S. Cl. ........................................ 536/91; 536/90; 536/95; 536/96
[58] Field of Search ............... 536/91, 84, 90, 95, 536/96, 99, 101

[56] References Cited

U.S. PATENT DOCUMENTS

| Re. 24,116 | 1/1956 | Klug | 536/91 |
|---|---|---|---|
| 2,137,343 | 11/1938 | Maxwell | 536/95 |
| 3,032,549 | 5/1962 | Mitchell | 536/84 |
| 3,131,176 | 4/1964 | Klug | 536/95 |
| 3,453,261 | 7/1969 | Scherff | 536/91 |
| 3,709,876 | 1/1973 | Glomski et al. | 536/91 |

FOREIGN PATENT DOCUMENTS

| 155752 | 5/1952 | Australia | 536/101 |
|---|---|---|---|
| 250478 | 10/1962 | Australia | 536/101 |
| 254003 | 3/1963 | Australia | 536/91 |
| 606626 | 10/1960 | Canada | 536/91 |
| 1177127 | 9/1964 | Fed. Rep. of Germany . | |
| 1222031 | 8/1966 | Fed. Rep. of Germany . | |
| 1455642 | 9/1966 | France . | |
| 798448 | 7/1958 | United Kingdom | 536/91 |
| 1076969 | 7/1967 | United Kingdom | 536/91 |
| 1139519 | 1/1969 | United Kingdom . | |

OTHER PUBLICATIONS

Chemical Abstracts, vol. 65, No. 9, Oct. 24, 1966, Abstract No. 65: 13947b.

*Primary Examiner*—Ronald W. Griffin
*Attorney, Agent, or Firm*—Connolly and Hutz

[57] ABSTRACT

A process for the production of water-soluble hydroxyalkyl methyl cellulose by the alkalization of the cellulose with sodium hydroxide and by subsequent etherification with alkylene oxide in an inert solvent, characterized in that before etherification, the alkali content of the aqueous alkali cellulose is reduced to 0.3–0.8 mols of NaOH/mol of cellulose by washing out with a suitable, known solvent (mixture), and is then etherified with an alkylene oxide in the liquid phase.

6 Claims, No Drawings

PROCESS FOR THE PRODUCTION OF HYDROXYALKYL METHYL CELLULOSES

This application is a continuation of application Ser. No. 488,019 filed Apr. 25, 1983, now abandoned.

This invention relates to a process for the production of water-soluble hydroxyalkyl methyl celluloses, according to which adequate etherification of the alkali cellulose is achieved although much smaller quantities of an etherification agent are used than usual.

According to experience, at least 1.2 mols of NaOH per mol of cellulose have to be used for alkalization for the production of an effectively water-soluble hydroxyethyl cellulose. After neutralisation with acetic acid, this corresponds to a salt content of at least 26%. As a result of alkalization with this minimum quantity of alkali, the crystal lattice of the native cellulose is converted into that of reactive sodium cellulose which is accessible to etherification. It is known from the literature (see Götze, Chemiefasern nach dem Viskoseverfahren, Volume I, page 349, Springer-Verlag 1967, 3rd Edition) that 1 mol of NaOH per mol of cellulose is chemically bound in the sodium cellulose, while the excess of NaOH is present in an adsorptively bound form. However, owing to this excess of alkali, the epoxide etherification agent is converted to a considerable extent into by-products (polyglycols and polyglycol ethers).

Moreover, the high water content of the alkali cellulose which is provided for etherification and is obtained by conventional methods influences the etherification reaction.

According to DE-AS No. 1,177,127, attempts have been made to overcome these disadvantages by a two-stage process. In the first stage, the cellulose is hydroxyethylated up to a molar substitution degree of 0.8 in the presence of from 0.8 to 3.2 mols of NaOH per mol of cellulose, and then the excess alkali is removed by washing out with water or aqueous alcohols. In the second stage, the partly oxyalkylated product is further oxyalkylated in the presence of the residual alkali until the water-soluble ether (molar substitution degree of >2) is formed. After neutralisation, the undesired salts are removed by washing out with conventional solvents. However, according to this method it is also impossible to stop the formation of by-products during the etherification reaction.

Surprisingly, it has now been found that it is possible to produce a water-soluble hydroxyalkyl methyl cellulose by a one-stage etherification reaction of an alkali cellulose containing a smaller than usual content of alkali.

Thus, the present invention provides a process for the production of water-soluble hydroxyalkyl methyl cellulose by the alkalization of the cellulose with sodium hydroxide and by a subsequent etherification with alkylene oxide in an inert solvent, wherein before any etherification reaction, the alkali content of the aqueous alkali cellulose is reduced to from 0.3 to 0.8 mols, preferably from 0.5 to 0.6 mols, of NaOH/mol of cellulose by washing out with a suitable, known solvent (mixture), and is then etherified with an alkylene oxide, preferably ethylene oxide, in a solvent different from said solvent used for washing out, preferably in methyl chloride in liquid phase, and is optionally purified again.

The alkali cellulose which is produced by the steeping or slurry alkalization process and which contains on average from 1.7 to 1.9 mols of NaOH per mol of cellulose is first washed with a solvent mixture. Washing centrifuges are appropriately suitable for this purpose in which the alkali cellulose may be treated with different solvents (mixtures), preferably water/alcohol or water/ketone mixtures for example, acetone/water (85:15), (all the ratios are by weight). isopropanol/water (85:15), methanol/acetone (50:50) and methanol/water (85:15), preferably with from 2 to 10 times the quantity of solvent, based on the alkali cellulose. A methanol/water (85:15) mixture is preferably used.

The washed alkali cellulose preferably containing from 0.5 to 0.6 mols of NaOH per mol of cellulose is then etherified with alkylene oxide, preferably ethylene oxide, in the presence of an inert solvent, preferably methyl chloride in the liquid phase. The use of methyl chloride provides the advantage that the NaOH being present in the alkali cellulose is substantially neutralised during etherification as a result of the saponification of the methyl chloride; thus it is unnecessary to carry out a separate neutralisation at the end of etherification.

Accordingly, the process according to the present invention provides the following advantages:

1. The quantity of alkali which is washed out may be easily recovered and may be re-used.
2. The low alkali and water content of the alkali cellulose used for etherification considerably reduces the formation of by-products of the etherification agents, so that much smaller quantities of etherification agent are necessary.
3. For this reason, etherification may not only be carried out at conventional temperatures of from 30° to 60° C., but may also be carried out at higher temperatures (up to 100° C.). Consequently, shorter reaction times are achieved with a constant substitution and yield.
4. The low alkali content of the etherified cellulose requires a correspondingly smaller quantity of neutralisation agent.
5. The content of salt, produced by neutralisation, in the end product is at the most half as much as when an unwashed alkali cellulose is used, so that the water-soluble products may be used in certain applications without an additional purification process.
6. If a salt-free hydroxyalkyl methyl cellulose is desired, then the commercial product which is produced by the present process may be purified at a much lower expense.

The hydroxyalkyl methyl cellulose produced according to the present invention may be used for all known applications, for example in dispersions painting colours or in drilling auxiliaries.

EXAMPLE 1

A softwood dissolving pulp of a medium viscosity level was alkalized at 32° C. by slurry alkalization with a sodium hydroxide of 200 g of NaOH per liter and was pressed off with a press factor PA of 2.7.

$$PA = \frac{\text{Weight of the moist alkali cellulose}}{\text{Weight of the cellulose which was used}}$$

The composition of the alkali cellulose was as follows:

| | % by weight | mol ratio to cellulose |
|---|---|---|
| Cellulose | 33 | 1 |

-continued

|  | % by weight | mol ratio to cellulose |
| --- | --- | --- |
| NaOH | 16 | 1.96 |
| Water | 51 | 13.9 |

This alkali cellulose was washed out in portions in a washing centrifuge with a solvent mixture of methanol/H₂O (85:15% by weight) and was centrifuged for 6 minutes at 2,800 r.p.m. The quantity of solvent amounted to 10 liters per kg of alkali cellulose used. The composition of the washed alkali cellulose was as follows:

|  | % by weight | mol ratio to cellulose |
| --- | --- | --- |
| Cellulose | 58 | 1 |
| NaOH | 5 | 0.37 |
| Solvent | 20 | 1.75 |
| Water | 17 | 2.6 |

1,725 g of this washed alkali cellulose were mixed in a stirrer-equipped autoclave with 1,500 g of ethylene oxide and 4,800 g of methyl chloride with regular stirring. The temperature was then increased to 55° C. and was maintained for 3 hours. Thereafter, the temperature was increased to 65° C. and was maintained for 1.5 hours. The methyl chloride and the unreacted ethylene oxide was then blown off and were collected in a cooled receiver. The methyl chloride and ethylene oxide were substantially removed by applying a vacuum. The product was dried in a circulating air drier at a temperature below 100° C.

The resulting cellulose ether had the following analytical data:

Molar hydroxyethyl substitution degree: 2.03
Average methoxyl substitution degree: 0.22
NaCl: 7.5% by weight.

The product was water-soluble, but the solution was cloudy owing to fibrous and gel-like particles (solution No. 5 on a value scale ranging from 1 to 6). The viscosity of a 3% by weight solution was 3,020 mPas, measured in a rotation viscosimeter. The pH was 9.5. No flocculation point appeared up to 100° C.

EXAMPLE 2

An alkali cellulose produced by slurry alkalization was washed out with methanol/H₂O (85:15% by weight) as in Example 1, but with only 4 liters of solvent per kg of alkali cellulose used. The composition of the washed alklai cellulose was as follows:

|  | % by weight | mol ratio to cellulose |
| --- | --- | --- |
| Cellulose | 52.5 | 1 |
| NaOH | 6.5 | 0.5 |
| Solvent | 20 | 1.9 |
| Water | 21 | 3.6 |

1,900 g of this washed alkali cellulose were mixed with 1,500 g of ethylene oxide and 4,900 g of methyl chloride in a stirrer-equipped autoclave, heated to 90°–94° C. and left for 3 hours at this temperature. The operations of blowing off the methyl chloride and unreacted ethylene oxide and drying the product were carried out as described in Example 1.

The following analytical data of the resulting cellulose ether were established:

Molar hydroxyethyl substitution degree: 2.21
Average methoxyl substitution degree: 0.31
NaCl: 10.7% by weight.

The product was water-soluble, and the solution was only slightly cloudy (solution No. 3-4). The viscosity of a 3% by weight solution was 775 mPas and the pH was 8.1. A flocculation point was not established up to 100° C.

EXAMPLE 3

An alkali cellulose produced by slurry alkalization was washed out with methanol/water (85:15% by weight) as in Example 1, but with only 2.7 (liters of solvent per kg of alkali cellulose used. The washed alkali cellulose had the following composition:

|  | % by weight | mol ratio to cellulose |
| --- | --- | --- |
| Cellulose | 55 | 1 |
| NaOH | 7.5 | 0.55 |
| Solvent | 11.5 | 1.06 |
| Water | 26 | 4.3 |

1,820 g of this washed alkali cellulose were mixed with 1,500 g of ethylene oxide and 5,000 g of methyl chloride in a stirrer-equipped autoclave. The temperature was increased to 90°–95° C. and was maintained for 3 hours.

The following analytical data of the cellulose ether were established:

Molar hydroxyethyl substitution degree: 2.60
Average methoxyl substitution degree: 0.33
NaCl: 12.3% by weight.

The product exhibited an outstanding clear solubility in water (solution No. 1-2). A 3% by weight solution had a viscosity of 179 mPas and the pH was 8.6. A flocculation point was not established up to 100° C.

EXAMPLE 4

1,820 g of washed alkali cellulose as in Example 3 were mixed with 1,500 g of ethylene oxide and 5,000 g of methyl chloride and were only etherified for 1 hour after increasing the temperature to 100°–102° C.

The analytical data was as follows:

Molar hydroxyethyl substitution degree: 2.61
Average methoxyl substitution degree: 0.35
NaCl: 12.6% by weight.

The product was completely clearly water-soluble, as in Example 3. A 3% by weight solution had a viscosity of 197 mPas and the pH was 8.9. A flocculation point was not established up to 100° C.

I claim:

1. A process for the production of water-soluble hydroxyalkyl methyl cellulose having a molar substitution greater than about two, which comprises alkalization of cellulose with sodium hydroxide to form aqueous alkali cellulose; reducing the alkali content of said aqueous alkali cellulose to 0.3 to 0.8 mols of NaOH/mol of cellulose by washing with a solvent or solvent mixture; etherification of the resulting alkali cellulose with an alkylene oxide in an inert solvent different from the solvent used for washing out; and optionally purifying the product.

2. A process as claimed in claim 1, wherein the alkali content is reduced to 0.5 to 0.6 mols of NaOH/mol of cellulose before any etherification reaction is carried out.

3. A process as claimed in claim 1, wherein the alkylene oxide is ethylene oxide.

4. A process as claimed in claim 1, wherein etherification is carried out in methyl chloride in the liquid phase.

5. A process as claimed in claim 1, wherein the solvent mixture used for washing out is a water/alcohol or water/ketone mixture.

6. A process as claimed in claim 5, wherein the solvent mixture is a methanol/water mixture.

* * * * *